United States Patent [19]

Sumiyoshi et al.

[11] 4,254,747
[45] Mar. 10, 1981

[54] INTAKE SYSTEM OF A MULTI-CYLINDER INTERNAL COMBUSTION ENGINE

[75] Inventors: Masaharu Sumiyoshi; Setsuro Sekiya; Katsuhiko Motosugi, all of Toyota, Japan

[73] Assignee: Toyota Jidosha Kogyo Kabushiki Kaisha, Toyota, Japan

[21] Appl. No.: 22,478

[22] Filed: Mar. 21, 1979

[30] Foreign Application Priority Data

Apr. 18, 1978 [JP] Japan .................................. 53/044856

[51] Int. Cl.³ .............................................. F02B 15/00
[52] U.S. Cl. .................................................. 123/52 M
[58] Field of Search .............. 123/52 M, 52 MV, 127, 123/75 B

[56] References Cited

U.S. PATENT DOCUMENTS

| | | | |
|---|---|---|---|
| 3,318,292 | 5/1967 | Hideg | 123/52 M X |
| 3,717,131 | 2/1973 | Chana et al. | 123/52 MV |
| 3,742,922 | 7/1973 | Hisatomi et al. | 123/52 M X |
| 3,809,032 | 5/1974 | Morris | 123/52 MV |
| 3,980,060 | 9/1976 | Noguchi et al. | 123/127 X |
| 4,064,850 | 12/1977 | Nakagawa et al. | 123/127 X |

*Primary Examiner*—Charles E. Phillips
*Attorney, Agent, or Firm*—Kenyon & Kenyon

[57] ABSTRACT

A multi-cylinder internal combustion engine having an intake manifold equipped with a variable venturi type carburetor. A secondary throttle valve is provided for each cylinder. Each of the secondary throttle valves is arranged in the respective manifold branch. An auxiliary intake passage is branched off from the collecting portion of the intake manifold and connected to a distribution channel formed in the cylinder head. Each of the intake ports is connected to the distribution channel via a corresponding channel branch which opens into the intake port at a position near the intake valve. A primary throttle valve is arranged in the auxiliary intake passage and opened in accordance with an increase in level of the load of an engine. The secondary throttle valves are opened after the opening degree of the primary throttle valve is increased beyond a predetermined opening degree.

17 Claims, 7 Drawing Figures

INTAKE SYSTEM OF A MULTI-CYLINDER INTERNAL COMBUSTION ENGINE

DESCRIPTION OF THE INVENTION

The present invention relates to an intake system for a multi-cylinder internal combustion engine.

Particularly in a gasoline engine, in order to obtain an improvement in the output power of the engine by increasing its volumetric efficiency when it is operating at a high speed under a heavy load, the shape of an intake port must be constructed so that it has minimal flow resistance. Since strong turbulence is spontaneously created in the combustion chamber of the engine when the engine is operating at a high speed under a heavy load, the burning velocity is advantageously increased. However, when the same engine is operating at a low speed, sufficient turbulence is not created in the combustion chamber, thus resulting in a problem that the desired increase in the burning velocity is not obtained.

One prior art method of creating a strong turbulence in the combustion chamber when an engine is operating at a low speed creates a swirl motion in the combustion chamber by using a helical intake port or by using a shroud valve. However, since the flow resistance is increased, volumetric efficiency is reduced. Consequently, in order to increase the burning velocity when an engine is operating at a low speed while ensuring a high volumetric efficiency when an engine is operating at a high speed under a heavy load, it is necessary to both form an intake port so that it has minimal flow resistance and, at the same time, create a strong turbulence in the combustion chamber when the engine is operating at a low speed. When an engine is operating at a low speed under a light load, the velocity of air flowing in the venturi of the carburetor is low. Consequently, since the difference in speed between the fuel flowing from the fuel nozzle and the air flowing in the venturi is small, the liquid fuel does not fully divide into fine particles. As a result of this, a large amount of fuel is fed into the cylinder in the form of a liquid, thereby resulting in poor and incomplete combustion. In a conventional engine, since the portion of the intake passage which is located downstream of the throttle valve has relatively large volume, good responsiveness of the engine to the accelerating operation cannot be obtained. Furthermore, since the portion of the intake passage located downstream of the throttle valve has a relatively large inner surface area, a large amount of fuel adheres onto the inner surface of the intake passage. Consequently, when the engine is decelerated so that the level of vacuum in the intake passage is rapidly increased, a large amount of the fuel adhering onto the inner surface of the intake passage is instantaneously vaporized. As a result of this, an excessively rich mixture is temporarily fed into the cylinder, thereby resulting in an increase in the amount of unburned HC in the exhaust.

An object of the present invention is to provide a multi-cylinder engine in which the above-mentioned various problems are simultaneously solved by improving an intake system positioned between the carburetor and the combustion chamber.

According to the present invention, there is provided a multi-cylinder internal combustion engine having a plurality of cylinders, each having a combustion chamber and an intake valve, at least one main intake passage common to at least two cylinders and a collecting portion having an inlet, and at least two main branch intake passages branched off from the collecting portion. Each of the main branch intake passages is connected to a respective combustion chamber via the corresponding intake valve. A fuel supply is arranged in the inlet of the collecting portion. At least one auxiliary intake passage is also provided having an outlet, an inlet which opens into the collecting portion, and at least two auxiliary branch intake passages branched off from the outlet. Each of the auxiliary branch intake passages has an outlet which opens into the respective main branch intake passage. Primary valve means are arranged in the auxiliary intake passage and are opened in accordance with the increase in the level of the load of the engine. Secondary valve means are arranged in the main branch intake passages and are operatively connected to the primary valve means for opening the secondary valve means after the opening of the primary valve means is increased beyond a predetermined opening degree.

The present invention may be more fully understood from the description of preferred embodiments of the invention set forth below, together with the accompanying drawings.

DESCRIPTION OF PREFERRED EMBODIMENTS

Figure 1:
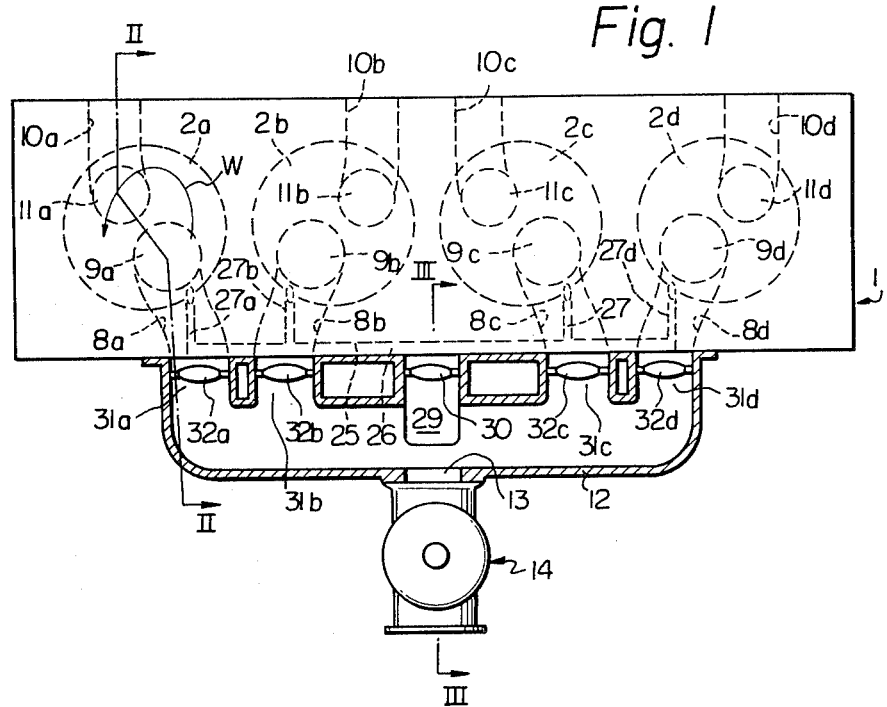
FIG. 1 is a plan view, partly in cross-section, of an embodiment of an engine according to the present invention.
Figure 2:
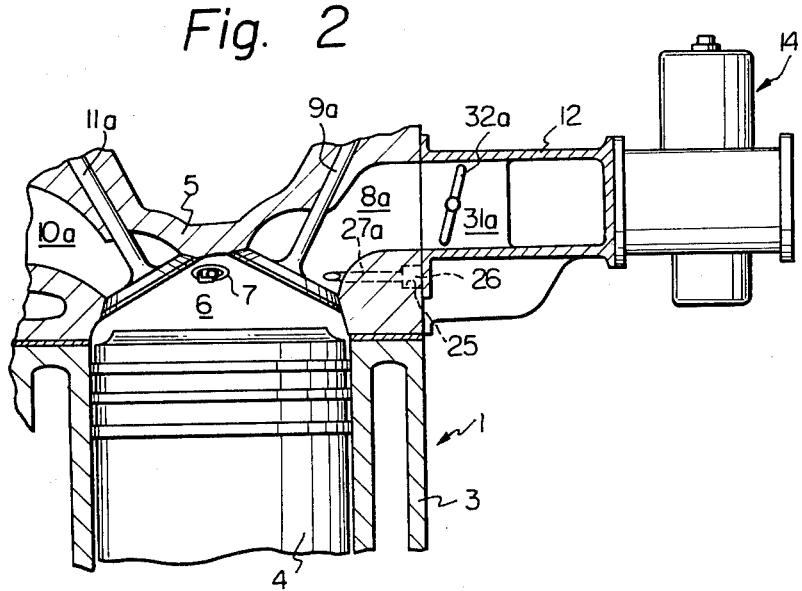
FIG. 2 is a cross-sectional side view taken along the line II—II in FIG. 1.
Figure 3:
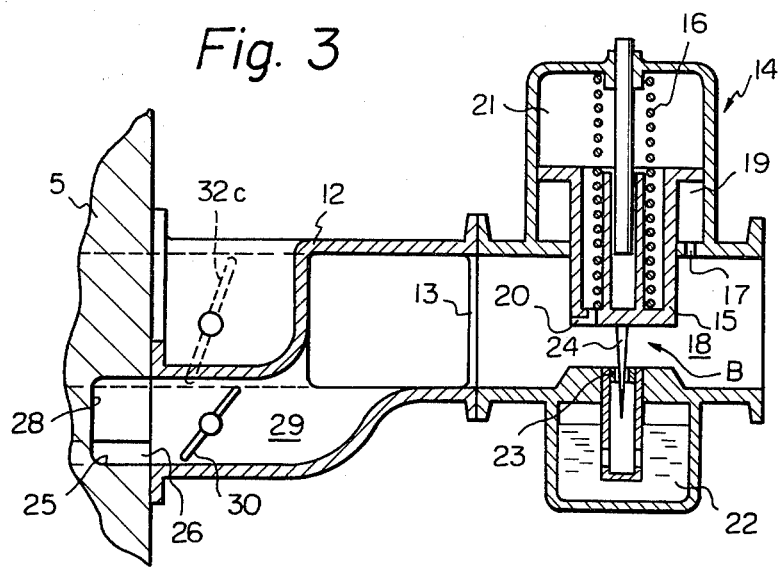
FIG. 3 is a cross-sectional side view taken along the line III—III in FIG. 1.

FIG. 1 illustrates the case wherein the present invention is applied to a four-cylinder engine. Referring to FIGS. 1 and 2, 1 designates an engine body, and 2a, 2b, 2c, 2d designate a No. 1 cylinder, a No. 2 cylinder, a No. 3 cylinder and a No. 4 cylinder, respectively; 3 designates a cylinder block, 4 a piston reciprocally movable in the cylinder block 3, 5 a cylinder head fixed onto the cylinder block 3, and 6 a combustion chamber formed between the piston 4 and the cylinder head 5; 7 designates a spark plug, and 8a, 8b, 8c, 8d designate intake ports formed in the cylinder head 5; 9a, 9b, 9c, 9d designate intake valves, 10a, 10b, 10c, 10d exhaust ports, 11a, 11b, 11c, 11d exhaust valves and 12 an intake manifold. In one embodiment of the invention, a variable venturi carburetor 14 which forms a constant vacuum level at a region located downstream of the carburetor 14 is arranged on an air inlet 13 which opens into the collecting portion of intake manifold 12. As illustrated in FIG. 3, the variable venturi type carburetor 14 comprises a suction piston 15 which is movable up and down, a compression spring 16 always biasing the suction piston 15 downwards, an atmospheric pressure chamber 19 connected via an air hole 17 to an air horn 18 located upstream of the suction piston 15, a vacuum chamber 21 connected via a vacuum port 20 to the air horn 18 located downstream of the suction piston 15, a float chamber 22, a metering jet 23, and a metering needle 24 fixed onto the suction piston 15 and passing through the metering jet 23. As is known to those skilled in the art, a vacuum of a constant level is produced in the air horn 18 located downstream of the suction piston 15 and, therefore, the velocity of air flowing in the venturi is maintained constant.

As illustrated in FIGS. 1 through 3, a groove 25 is formed on the outer wall of the cylinder head 5 and is covered by the mounting flange of the intake manifold 12 to form an auxiliary branch intake passage distribution channel 26 having a small cross-sectional area within the groove 25. In addition, auxiliary branch intake passages 27a, 27b, 27c, 27d, each having a small cross-sectional area and extending straight towards the corresponding intake ports 8a, 8b, 8c, 8d, are formed in the cylinder head 5 and are open on the inner wall of the intake ports 8a, 8b, 8c, 8d at a position near the valve head of the intake valves 9a, 9b, 9c, 9d, respectively. The opening of each of the auxiliary branch intake passages 27a, 27b, 27c, 27d is directed to a valve gap formed between the valve head of the intake valve 9a, 9b, 9c, 9d and the valve seat thereof when the intake valve 9a, 9b, 9c, 9d opens. In addition, the opening of each of the auxiliary branch intake passages 27a, 27b, 27c, 27d is orientated to the circumferential direction of the combustion chamber 6 so that, when the intake valve 9a, 9b, 9c, 9d opens, the mixture spouted from the auxiliary branch intake passages 27a, 27b, 27c, 27d flows into the combustion chamber 6 through the above-mentioned valve gap, thereby causing a strong swirl motion in the combustion chamber 6. As illustrated in FIG. 3, the auxiliary branch intake passage distribution channel 26 has an enlarged groove portion 28 at the central portion thereof which is connected to the collecting portion of the intake manifold 12 via a common auxiliary intake passage 29 formed in the intake manifold 12. A primary throttle valve 30 is arranged in the auxiliary intake passage 29. The intake manifold 12 comprises four main branch intake passages 31a, 31b, 31c, 31d, each of which is connected to one of respective intake ports 8a, 8b, 8c, 8d. As illustrated in FIGS. 1 through 3, secondary throttle valves 32a, 32b, 32c, 32d are each arranged in a corresponding one of the main branch intake passages 31a, 31b, 31c, 31d at a position near the corresponding intake ports 8a, 8b, 8c, 8d, that is, at the outlets of the main branch intake passages 31a, 31b, 31c, 31d.

Figure 5:
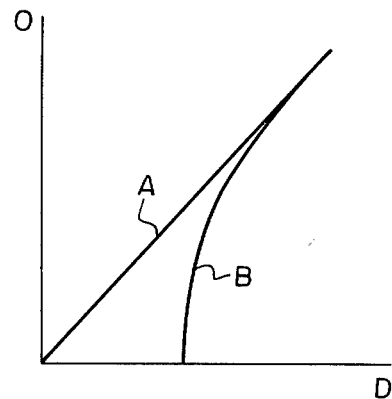
FIG. 5 is a graph showing changes in the opening degree of the primary and the secondary throttle valves.

FIG. 5 shows the changes the opening degree of the primary throttle valve 30 relative to the opening degree of the secondary throttle valves 32a, 32b, 32c, 32d. In FIG. 5, the ordinate 0 indicates opening degree, and the abscissa D indicates depression of the accelerator pedal (not shown). Line A indicates the opening degree of the primary throttle valve 30, and line B indicates the opening degree of the secondary throttle valves 32a, 32b, 32c, 32d. From FIG. 5, it will be understood that the opening degree of the primary throttle valve 30 is increased in proportion to an increase in the depression of the accelerator pedal. However, the secondary throttle valves 32a, 32b, 32c, 32d open after the opening degree of the primary throttle valve 30 is increased beyond a predetermined opening degree.

Figure 4:
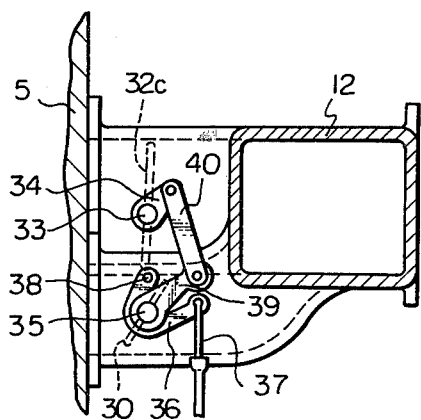
FIG. 4 is a side view of a link mechanism for actuating the primary and the secondary throttle valves.

FIG. 4 illustrates an example of a valve actuating mechanism capable of obtaining the opening degree shown in FIG. 5. Referring to FIG. 4, reference numeral 33 designates a secondary throttle shaft common to the secondary throttle valves 32a, 32b, 32c, 32d; 34 designates an arm fixed onto the secondary throttle shaft 33; 35 a primary throttle shaft of the primary throttle valve 30; and 36 a lever fixed onto the primary throttle shaft 35. One of the ends of the lever 36 is connected to the accelerator pedal via a wire 37 and the other end of the lever 36 has a projecting pin 38 fixed thereto. Arm 39 is rotatably mounted on the primary throttle shaft 35, and the tip of the arm 39 and the tip of the arm 34 are interconnected to each other by means of a link 40. The secondary throttle valves 32a, 32b, 32c, 32d are always urged in the counter-clockwise direction by means of a spring (not shown) and, consequently, the secondary throttle valves 32a, 32b, 32c, 32d are normally positioned at a closed position, in which they completely close the main branch intake passages 31a, 31b, 31c, 31d, as shown in FIG. 4. When the accelerator pedal is depressed, the lever 36 is rotated in the clockwise direction and, thus, the primary throttle valve 30 is opened. When the accelerator pedal is further depressed, the projecting pin 38 of the lever 36 comes into engagement with the arm 39 and, as a result, the arm 39 is rotated in the clockwise direction. Thus, the secondary throttle valves 32a, 32b, 32c, 32d are opened.

As is shown in FIG. 5, when the engine is operating under a light load, only the primary throttle valve 30 is opened. Consequently, at this time, the mixture formed in the carburetor 14 is delivered to the combustion chamber 6 via respective auxiliary branch intake passages 27a, 27b, 27c, 27d; auxiliary intake passage 29, the primary throttle valve 30 and the distribution channel 26 when the respective one of intake valve 9a, 9b, 9c, 9d opens. As mentioned previously, the auxiliary branch intake passage distribution channel 26 and the auxiliary branch intake passages 27a, 27b, 27c, 27d have small cross-sectional area compared with that of the main branch intake passages 31a, 31b, 31c, 31d, and thus, the mixture formed in the carburetor 14 is caused to flow at a high speed in the distribution channel 26 and the auxiliary branch intake passages 27a, 27b, 27c, 27d. As a result of this, the flow energy is added to the mixture during the time the mixture flows in the distribution channel 26 and the auxiliary branch intake passages 27a, 27b, 27c, 27d, and thus, the vaporization of the liquid fuel contained in the mixture is promoted. In addition, as mentioned previously, a strong swirl motion, as shown by the arrow W in FIG. 1, is caused in the combustion chamber 6 by the mixture spouted from the auxiliary branch intake passages 27a, 27b, 27c, 27d and, as a result, the burning velocity is considerably increased.

On the other hand, the shapes of the intake ports 8a, 8b, 8c, 8d are so constructed that the flow resistance which the mixture flowing therein is subjected to is minimized. Consequently, when the accelerator pedal is depressed and, thus, the secondary throttle valves 32a, 32b, 32c, 32d are opened, a large part of the mixture flows into the combustion chamber 6 via the main branch intake passages 31a, 31b, 31c, 31d, having a low flow resistance, and via the intake ports 8a, 8b, 8c, 8d, also having a low flow resistance. As a result of this, when the engine is operating at a high speed under a heavy load, a high volumetric efficiency can be ensured and, at the same time, a satisfactory high burning velocity can also be ensured by the turbulence which is produced in the combustion chamber 6.

As is illustrated in FIGS. 1 through 4, since the secondary throttle valves 32a, 32b, 32c, 32d are arranged near the outlets of the main branch intake passages 31a, 31b, 31c, 31d, the volume of the portion of the main branch intake passage which is located downstream of the secondary throttle valves 32a, 32b, 32c, 32d is small and, as a result, the responsiveness of an engine to the depressing of the accelerator pedal can be improved. In addition, since the inner surface area of the main branch intake passage portion which is located downstream of the secondary throttle valves 32a, 32b, 32c, 32d is small, the amount of fuel adhering onto the inner surface of the intake passage located downstream of the secondary throttle valves 32a, 32b, 32c, 32d is reduced over conventional engines. As a result of this, it is possible to prevent the mixture fed into the cylinders from becoming excessively rich at the time of deceleration. Furthermore, as mentioned previously, since the level of vacuum produced in the intake manifold 12 is maintained constant, the distribution of fuel to each cylinder becomes uniform. Such uniformity is enhanced by reducing the intake interference between the cylinders by arranging the secondary throttle valves 32a, 32b, 32c, 32d in main branch intake passages 31a, 31b, 31c, 31d.

Figure 6:
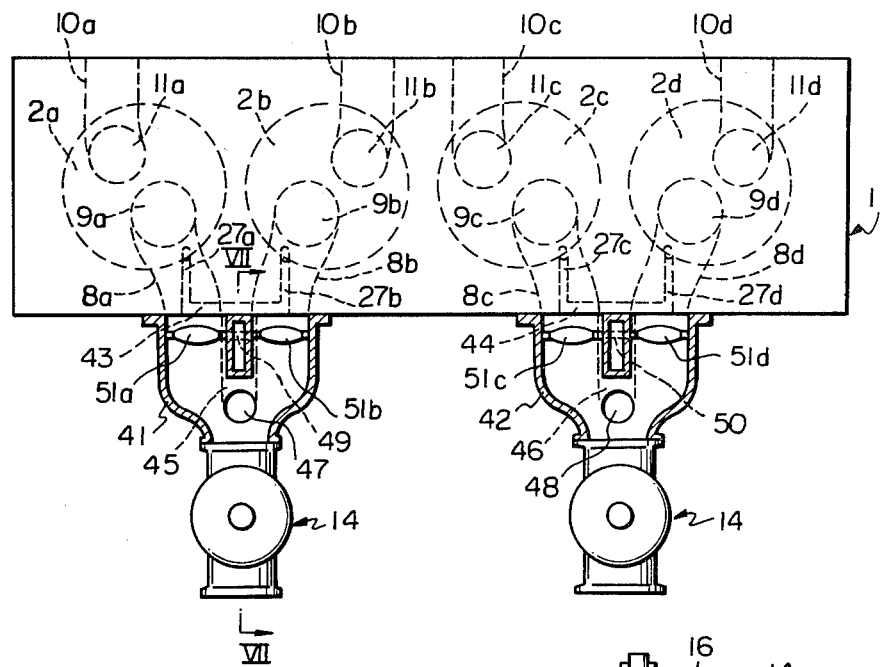
FIG. 6 is a plan view, partly in cross-section, of an alternative embodiment according to the present invention.
Figure 7:
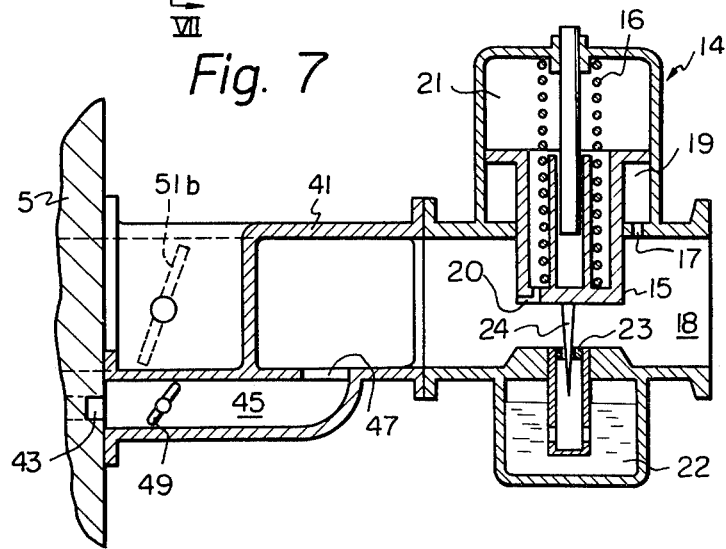
FIG. 7 is a cross-sectional side view taken along the line VII—VII in FIG. 6.

FIGS. 6 and 7 illustrate an alternative embodiment. In FIGS. 6 and 7, similar components are indicated with the same reference numerals in FIG. 1. Referring to FIG. 6, a pair of intake manifolds 41 and 42, each being common to two cylinders, is provided and each of the intake manifold 41 and 42 is equipped with a respective carburetor 14 of a variable venturi type. A pair of auxiliary branch intake passage distribution channels 43 and 44 are formed on the outer wall of the cylinder head 5. The distribution channel 43 is connected to the auxiliary branch intake passages 27a, 27b, while the distribution channel 44 is connected to the auxiliary branch intake passages 27c, 27d. In this embodiment, the distribution channels 43 and 44 may be interconnected to each other via a balance channel (not shown) formed on the outer wall of the cylinder head 5. The distribution channels 43 and 44 are connected to the collecting portions of the intake manifolds 41 and 42 via auxiliary intake passages 45 and 46 formed in the intake manifolds 41 and 42 and via openings 47 and 48, respectively. Primary throttle valves 49 and 50 are arranged in the auxiliary intake passages 45 and 46, respectively, and secondary throttle valves 51a, 51b, 51c, 51d are arranged in the main branch intake passages of the intake manifolds 41 and 42. The opening degree of the primary throttle valves 49, 50 and the opening degree of the secondary throttle valves 51a, 51b, 51c, 51d are indicated by the lines A and B in FIG. 5, respectively.

According to the present invention, the burning velocity can be considerably increased by the creation of a strong swirl motion in the combustion chamber and by the promotion of vaporization of fuel when an engine is operating under a light load, while ensuring a high volumetric efficiency when the engine is operating at a high speed under a heavy load. In addition, by arranging the secondary throttle valves at the outlet of the main branch intake passages, the responsiveness of an engine to the depressing of the accelerator pedal and the distribution of fuel to each cylinder can be improved and, in addition, the amount of unburned HC in the exhaust gas can be reduced at the time of deceleration.

While the invention has been described by reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine having a plurality of cylinders, each having a combustion chamber and an intake valve, said engine comprising:
   at least one main intake passage common to at least two cylinders and comprising a collecting portion having an inlet, and at least two main branch intake passages branched off from said collecting portion, each of said main branch intake passages being connected to the respective combustion chamber via the corresponding intake valve;
   fuel supply means arranged in the inlet of said collecting portion;
   at least one auxiliary intake passage having an outlet, and an inlet which opens into said collecting portion;
   at least two auxiliary branch intake passages branched off from the outlet of said auxiliary intake passage, each of said auxiliary branch intake passages having an outlet which opens into the respective main branch passage at a place near the valve gap formed between the corresponding intake valve and a valve seat thereof when the intake valve is open, the outlet being directed in the circumferential direction of the corresponding combustion chamber;
   primary valve means arranged in said auxiliary intake passage and opened in accordance with increase in level of the load of an engine, and;
   secondary valve means arranged in said main branch intake passages and operatively connected to said primary valve means for opening said secondary valve means after the opening degree of said primary valve means is increased beyond a predetermined opening degree.

2. A multicylinder internal combustion engine as claimed in claim 1, wherein each of said auxiliary branch intake passages has a cross-section which is smaller than that of said main branch intake passage.

3. A multicylinder internal combustion engine as claimed in claim 1, wherein said auxiliary intake passage has a cross-section which is smaller than that of said main branch intake passage.

4. A multicylinder internal combustion engine as claimed in claim 1, wherein said engine further comprises a cylinder head and at least one intake manifold forming a part of said main branch intake passages therein, a part of said auxiliary branch intake passages being formed between said cylinder head and said intake manifold.

5. A multicylinder internal combustion engine as claimed in claim 4, wherein said auxiliary intake passage is formed in said intake manifold.

6. A multicylinder internal combustion engine as claimed in claim 4, wherein the remaining part of said auxiliary branch intake passages is formed in said cylinder head.

7. A multi-cylinder internal combustion engine as claimed in claim 1, wherein said primary valve means comprises at least one primary throttle valve.

8. A multi-cylinder internal combustion engine as claimed in claim 1, wherein said secondary valve means comprises at least two secondary throttle valves, each being arranged in the respective main branch intake passages.

9. A multicylinder internal combustion engine as claimed in claim 8, wherein said secondary throttle valves are fixed onto a common throttle shaft.

10. A multicylinder internal combustion engine as claimed in claim 8, wherein each of said secondary throttle valves is arranged at a position near said intake valve.

11. A multi-cylinder internal combustion engine as claimed in claim 10, wherein said engine further comprises at least one intake manifold having at least two outlets, each of said secondary throttle valves being arranged at a respective outlet of said intake manifold.

12. A multi-cylinder internal combustion engine as claimed in claim 1, wherein said engine further comprises link means mechanically interconnecting said primary valve means with said secondary valve means for opening said secondary valve means after the opening degree of said primary valve means is increased beyond a predetermined opening degree.

13. A multi-cylinder internal combustion engine as claimed in claim 12, wherein said link means comprises a rotatable first arm connected to said primary valve means, a rotatable second arm connected to said secondary valve means, a link interconnecting said first arm with said second arm, and a rotatable lever rotated in accordance with the increase in the level of the load of an engine and being arranged to be engageable with said first arm.

14. A multicylinder internal combustion engine as claimed in claim 1, wherein said fuel supply means comprises at least one mass flow type carburetor.

15. A multi-cylinder internal combustion engine as claimed in claim 14, wherein said carburetor is a variable venturi type carburetor.

16. A multi-cylinder internal combustion engine having a plurality of cylinders, each having a combustion chamber and an intake valve, said engine comprising:
at least one main intake passage common to at least two cylinders and comprising a collecting portion having an inlet, and at least two main branch intake passages branched off from said collecting portion, each of said main branch intake passages being connected to the respective combustion chamber via the corresponding intake valve;
fuel supply means arranged in the inlet of said collecting portion;
at least one auxiliary intake passage having an outlet, and an inlet which opens into said collecting portion;
at least two auxiliary branch intake passages branched off from the outlet of said auxiliary intake passage, each of said auxiliary branch intake passages having an outlet which opens into the respective main branch passage at a place near the valve gap formed between the corresponding intake valve and a valve seat thereof when the intake valve is open, the outlet being directed in the circumferential direction of the corresponding combustion chamber;
primary valve means arranged in said auxiliary intake passage and opened in accordance with increase in level of the load of an engine; and
secondary valve means having at least two secondary throttle valves, which valves are mechanically connected and disposed in respective main branch intake passages near the respectively corresponding intake valves.

17. A multi-cylinder internal combustion engine as claimed in claim 16, wherein said engine further comprises link means mechanically interconnecting said primary valve means with said secondary valve means for opening said secondary valve means after the opening degree of said primary valve means is increased beyond a predetermined opening degree.

* * * * *